(12) United States Patent
Possert et al.

(10) Patent No.: US 10,612,404 B2
(45) Date of Patent: Apr. 7, 2020

(54) JOINT COVER WITH IMPROVED MANIFOLD BLOCK FOR DUCT LEAK DETECTION SYSTEM

(71) Applicant: Senior IP GmbH, Schaffhausen (CH)

(72) Inventors: Eric M. Possert, Pacoima, CA (US); Muhannad Owdeh, Glendale, CA (US); Karim Ali, Culver City, CA (US)

(73) Assignee: Senior IP GmbH, Schaffhausen (CH)

( * ) Notice: Subject to any disclaimer, the term of this patent is extended or adjusted under 35 U.S.C. 154(b) by 300 days.

(21) Appl. No.: 15/583,913

(22) Filed: May 1, 2017

(65) Prior Publication Data
US 2018/0313219 A1    Nov. 1, 2018

(51) Int. Cl.
*F01D 9/02* (2006.01)
*F01D 17/02* (2006.01)
(Continued)

(52) U.S. Cl.
CPC .............. *F01D 9/023* (2013.01); *B64D 13/02* (2013.01); *F01D 17/02* (2013.01); *F01D 17/20* (2013.01);
(Continued)

(58) Field of Classification Search
CPC .......... F01D 25/00; F01D 17/20; F01D 17/02; F01D 9/023; B64D 13/02; F02C 6/08;
(Continued)

(56) References Cited

U.S. PATENT DOCUMENTS 2,417,741 A    3/1947   Dillon
2,571,236 A    10/1951  Hamilton, Jr.
(Continued)

FOREIGN PATENT DOCUMENTS

CA    2478729 A1   12/2005
CH     682416 A5    9/1993
(Continued)

OTHER PUBLICATIONS

International Search Report for PCT international patent application No. PCT/EP2018/060307, dated Jun. 12, 2018.
(Continued)

*Primary Examiner* — Eric Keasel
*Assistant Examiner* — Kevin R Barss
(74) *Attorney, Agent, or Firm* — Greenberg Traurig, LLP

(57) ABSTRACT

A manifold assembly configured for integration with a joint cover apparatus in a ducting system to detect leaking gas comprises an elastomeric manifold block having a substantially circular inlet aperture and one or more gas passages fluidly coupled to the inlet aperture. The assembly includes a flow control valve configured to maintain a closed state in which a component of the flow control valve sealingly engages with the inlet aperture to preclude gas at the inlet aperture from flowing into the one or more gas passages until said gas reaches a pressure corresponding to a pressure threshold. The assembly also includes at least one aperture control plate disposed substantially proximate to a lower end of the manifold block and including a substantially circular opening. The aperture control plate is adapted to maintain the substantial circularity of the inlet aperture, so as to ensure a substantially fluid-tight seal.

20 Claims, 13 Drawing Sheets

(51) Int. Cl.

| | | |
|---|---|---|
| *F01D 17/20* | (2006.01) | |
| *F16K 15/04* | (2006.01) | |
| *F16L 59/18* | (2006.01) | |
| *B64D 13/02* | (2006.01) | |
| *F02C 6/08* | (2006.01) | |
| *F01D 25/00* | (2006.01) | |
| *F16L 23/16* | (2006.01) | |
| *F02C 7/00* | (2006.01) | |
| *B64D 13/06* | (2006.01) | |

(52) U.S. Cl.
CPC ............... *F01D 25/00* (2013.01); *F02C 6/08* (2013.01); *F02C 7/00* (2013.01); *F16K 15/044* (2013.01); *F16L 23/16* (2013.01); *F16L 59/184* (2013.01); *B64D 2013/0607* (2013.01); *F05D 2260/606* (2013.01); *F05D 2300/10* (2013.01)

(58) Field of Classification Search
CPC ........... F02C 7/00; F16L 23/16; F16L 59/184; Y10T 137/5762; F16K 15/044
See application file for complete search history.

(56) References Cited

U.S. PATENT DOCUMENTS

| | | | |
|---|---|---|---|
| 2,817,230 A | | 12/1957 | McCully |
| 3,006,048 A | | 10/1961 | Windish |
| 3,235,098 A | * | 2/1966 | Emrick ................ F16K 15/044 137/539.5 |
| 3,299,417 A | | 1/1967 | Sibthorpe |
| 3,307,574 A | | 3/1967 | Anderson |
| 3,350,832 A | * | 11/1967 | Persson .................. B02C 17/22 52/461 |
| 3,371,521 A | | 3/1968 | Hauk |
| 3,675,540 A | * | 7/1972 | Murata ............... G01L 19/0645 92/104 |
| 3,744,825 A | | 7/1973 | Cooper et al. |
| 3,871,209 A | | 3/1975 | Hasha |
| 4,429,566 A | | 2/1984 | Armell et al. |
| 4,534,662 A | | 8/1985 | Barlian |
| 4,613,163 A | | 9/1986 | Grosshandler |
| 4,671,675 A | | 6/1987 | Arisi et al. |
| 4,726,488 A | * | 2/1988 | Kasugai ............. B60K 15/0406 137/493.9 |
| 4,750,189 A | | 6/1988 | Lancaster et al. |
| 4,775,855 A | | 10/1988 | Cox |
| 4,874,007 A | | 10/1989 | Taylor |
| 4,926,680 A | | 5/1990 | Hasha et al. |
| 5,067,094 A | | 11/1991 | Hayes |
| 5,176,025 A | | 1/1993 | Butts |
| 5,330,720 A | | 7/1994 | Sorbo et al. |
| 5,411,162 A | | 5/1995 | Koziczkowski et al. |
| 5,669,419 A | | 9/1997 | Haas |
| 5,969,618 A | | 10/1999 | Redmond |
| 6,000,104 A | | 12/1999 | Mann |
| 6,354,140 B1 | | 3/2002 | Farkas et al. |
| 6,498,991 B1 | | 12/2002 | Phelan et al. |
| 6,799,452 B2 | | 10/2004 | Brunet et al. |
| 6,860,527 B2 | | 3/2005 | Wagner et al. |
| 7,155,961 B2 | | 1/2007 | Fernandes et al. |
| 8,708,554 B2 | | 4/2014 | Thompson et al. |
| 9,228,496 B2 | | 1/2016 | West |
| 2008/0264081 A1 | | 10/2008 | Crowell et al. |
| 2010/0032606 A1 | | 2/2010 | Strobel et al. |
| 2010/0037974 A1 | | 2/2010 | Fernandes et al. |
| 2012/0018014 A1 | | 1/2012 | Fernandes et al. |
| 2013/0333770 A1 | * | 12/2013 | Maita .................... F02M 59/48 137/315.41 |
| 2014/0331704 A1 | * | 11/2014 | Kondrk ............... F16K 17/0413 62/190 |

FOREIGN PATENT DOCUMENTS

| | | |
|---|---|---|
| DE | 3246227 A1 | 6/1984 |
| EP | 0240620 A1 | 10/1987 |
| EP | 1602910 A1 | 12/2005 |
| GB | 2226417 A | 6/1990 |
| RU | 2004125887 A | 2/2006 |
| SU | 1164511 A1 | 6/1985 |
| SU | 1839237 A1 | 1/1990 |
| WO | 0144773 A2 | 6/2001 |
| WO | 02088656 A1 | 11/2002 |

OTHER PUBLICATIONS

Written Opinion of the International Searching Authority for PCT international patent application No. PCT/EP2018/060307, dated Jun. 12, 2018.
International Search Report for PCT international patent application No. PCT/US11/01288, dated Jan. 19, 2012.

* cited by examiner

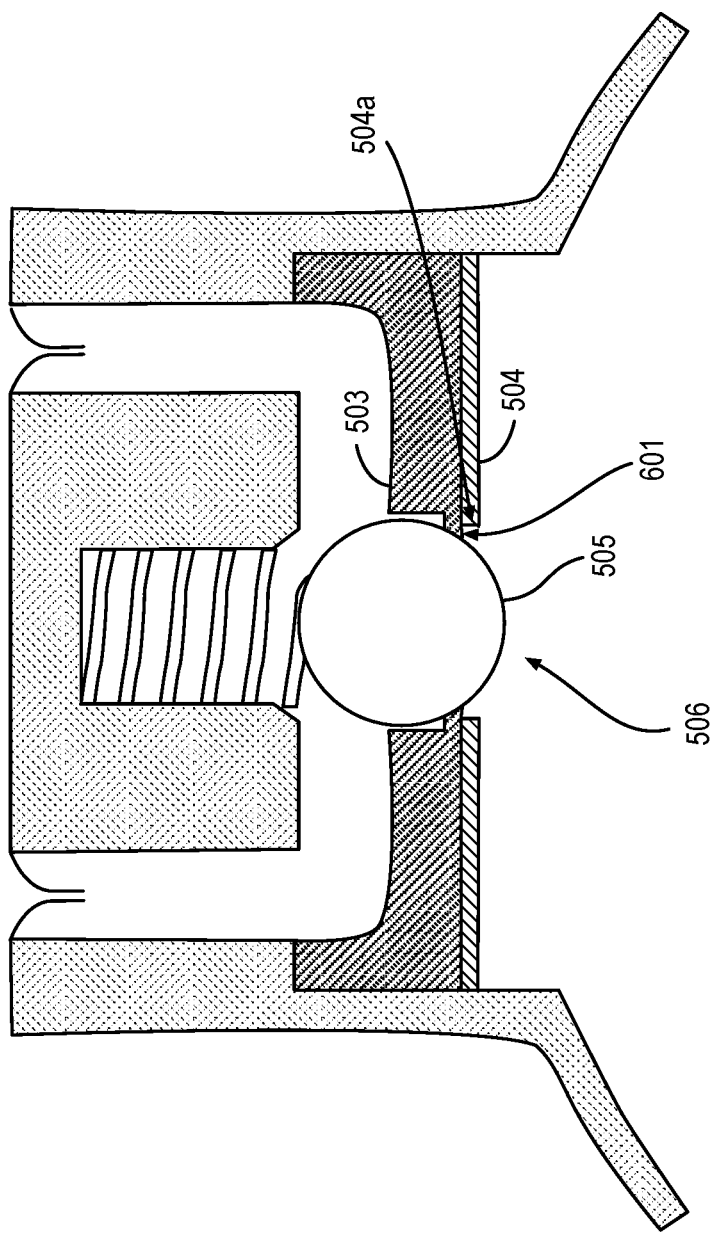

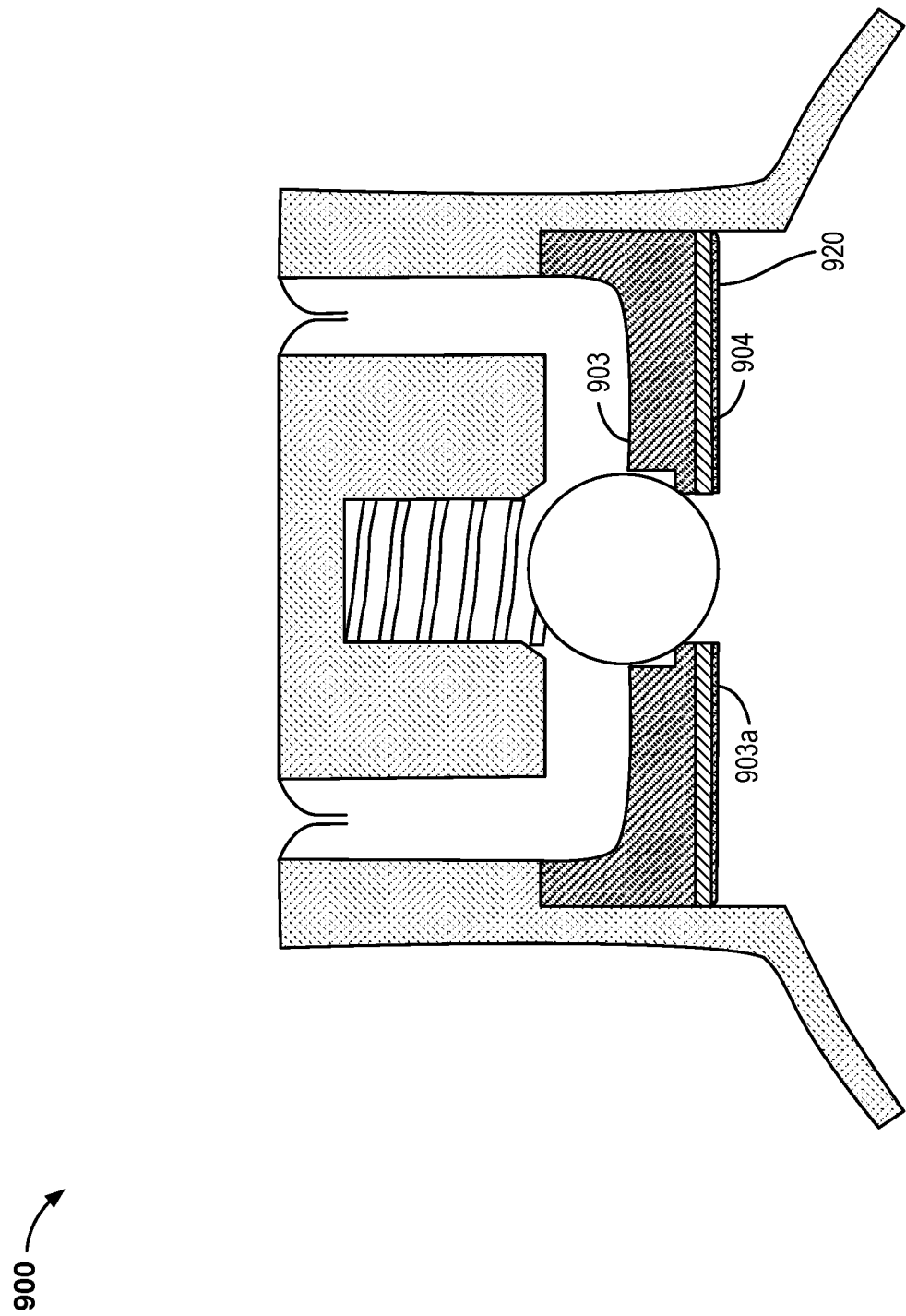

JOINT COVER WITH IMPROVED MANIFOLD BLOCK FOR DUCT LEAK DETECTION SYSTEM

FIELD OF THE INVENTION

The present invention relates to the field of aerospace, and, in particular, to modern aircraft which utilize the flow of hot compressed bleed air from the engines for various on-board functions.

BACKGROUND OF THE INVENTION

The present invention relates to the use of ducting systems in aircraft structures. Amongst the prior art, it is well known in the art to use high temperature bleed air from the engines for various on-board purposes in a modern aircraft. Typically, a stream of hot air bled from the engines is used to provide an anti-icing function on the leading edge of the wings and empennage of the aircraft and is also used by the air conditioning units to supply fresh air to the passenger cabin. The bleed air must therefore be transported from the engines to various other areas of the aircraft, and this is typically accomplished utilizing insulated metallic ducts ranging in diameter from 1.00" to 6.50" and ranging in length from at least 6". The air in the duct can reach pressures up to 450 psig and temperatures of 1200° F., but is typically at a pressure of 60 psig and 800° F. in temperature.

The ducts carrying the engine bleed air are insulated to prevent damage to the aircraft. An insulation blanket is wrapped around the exterior of the duct. This insulation blanket may be composed of a material of the type sold under the tradename Q-Felt® and manufactured by the Johns-Manville Corporation of Denver, Colo. The insulation blanket is capable of lowering the exterior temperature of the duct from 800° F. to about 400° F. or less. A fiberglass impregnated silicone-rubber, textured metal foil, or fiberglass impregnated polyimide resin insulation shell is then wrapped around the exterior of the duct to contain the insulation blanket.

The ducts of the type mentioned herein can develop leaks from the cracking of the inner metallic duct. If such cracks go undetected, catastrophic failure of the duct can result. Therefore, it is necessary to have sensors positioned along the length of the duct to detect any leakage from the duct.

Prior art leak detection sensing systems consisted of a vent disk, which is a disk having a hole therein, which allowed a stream of hot air to escape the silicone-rubber, texturized foil, or polyimide resin insulation shell. In the event that a duct developed a crack, hot bleed air will flow from the metallic duct wall through the insulation blanket and to the vent disk, then through the hole in the vent disk. The vent disk hole is designed to spread the flow of hot air in a cone-like spray pattern impinging on a pair of heat detection wires spaced approximately 1.0" apart and positioned approximately 1.00" to 1.75" from the outer circumference of the duct. The heat detection wires are of the type sold under the tradename Firewire® and manufactured by Kidde Graviner Limited of the United Kingdom. The heat sensing wires which change their electrical characteristics when exposed to a predetermined temperature. In the case of typical prior art systems used in aircraft, the detection circuit will trip when the wire is exposed to a temperature of approximately 255° F. It is required that both wires of the pair of wires in proximity to the duct be exposed to this temperature before an alarm will be raised to the pilot of the aircraft, to prevent false alarms.

It is desirable that the leak detectors be able to detect a leak in the metallic duct through a crack having the equivalent area of a 5 mm diameter hole. In practice, it has been found that the prior art leak detection systems fail to detect such leaks. The primary reason for the failure of the prior art design is that there is insufficient air flow through the vent disk hole. This results in the hot air stream having insufficient temperature to trip the heat detection wires. First, the temperature of the hot air through the leakage in the metal duct is significantly reduced as the hot air passes through the insulation blanket. Second, the insulation blanket impedes the passage of the hot air from the site of the leak to the vent disk hole, underneath the silicone-rubber, texturized foil, or polyimide resin insulation shell. Further, it has been found that, by the time the air has traversed the distance between the vent disk hole and the sensor wires, it has fallen to a temperature well below the 255° F. necessary to trip the leak detection wires.

Therefore, it is desirable to improve the design of the leak detection system such that a leak through a crack in the metallic duct having an equivalent area of a 5 mm diameter hole is successfully detected. It is also desirable that the new design be able to be economically retrofitted into existing aircraft. In particular, it is desirable that the same existing sensor wires be used and that it not be necessary to remove the existing insulation and to re-insulate the ducts to install the improved leak detection system.

At the joints between adjacent sections of duct, such as bleed air ducts in aircraft wings, the joints are typically constructed by abutting connection flanges between adjacent duct sections, and then by clamping those connection flanges together through the use of a band clamp or similar mechanism. Because this is a clamped arrangement, and not, e.g., a weld or other sealing structure, a certain amount of leakage is permitted and anticipated. Inasmuch as temperature sensor wires and temperature sensing systems have attained a high degree of sensitivity and responsiveness, it is desirable to provide a bleed leak detection system which is capable of discriminating between the low-level leakage that is part of ordinary and acceptable operating conditions, and the higher-level leakage which indicates either a failure of a joint, or failure of the ducting, not necessarily at the joint but in its vicinity, or even at a distance from the joint.

Additionally, duct leak detection systems can experience high temperatures and pressures. Under these harsh conditions, manufacturing imperfections—such as small cracks or deformities formed during manufacturing—may become exacerbated, resulting in unintended gas leakage and potentially producing false alarms. Furthermore, high temperatures can cause thermal expansion and warping of certain materials, inundating components of the leak detection system itself—potentially leading to another source of unintended gas leaks.

The conditions that result in a gas leak may vary among systems. In some cases, a minor amount of gas leakage may be considered dangerous. In other cases, a small amount of gas leakage may be acceptable. Additionally, various ducting systems may each experience a different level of gas pressure therein. It is accordingly another objective of the present invention to provide an adjustable duct leak detection system to accommodate different levels of gas pressure.

Where components of the leak detection system itself, such as the elastomeric manifold block insert, can be affected by heat and/or pressure, it is especially important to ensure the integrity and adjustability of these elements to, in turn, ensure their reliability.

These and other objectives and advantages will become apparent from the following detailed written description and figures.

SUMMARY OF THE INVENTION

To produce air flow with adequate velocity, the laws of fluid dynamics dictate the necessity for both air pressure and volume. If sufficient air pressure exists at low volume, air flow velocity cannot be sustained once the volume is quickly depleted. If sufficient air volume is present without pressure, there is practically no movement of air from a high to a low pressure environment.

When the metallic duct develops a crack, the hot air leaks from duct interior to the insulation blanket. The insulation blanket changes the characteristics of the hot air leakage 1) by absorbing the thermal energy and reducing the air temperature; 2) by reducing the effective pressure due to pressure drop; and 3) by reducing the volume by diffusing the air in the annulus between metal duct and insulation shell throughout the length of the duct.

Leak detection devices described herein may include manifold assemblies formed from two or more different materials. In a preferred embodiment, an elastomeric manifold body may include one or more metal plates adhered thereto or integrated therein, which serve to reinforce the elastomer and to maintain the shape of the manifold body under high temperatures, pressures and external loads. The combination of metal and elastomer provides structural integrity, resists deformation due to thermal expansion and other environmental forces, and provides a consistent and robust seal due to the flexibility and compressibility of the elastomer.

According to a first aspect of the present invention, there is provided a manifold assembly configured for integration with a joint cover apparatus in a ducting system to detect leaking gas. The manifold assembly includes an elastomeric manifold block having a substantially circular inlet aperture and one or more gas passages having upper ends and fluidly coupled to the inlet aperture. The upper ends of said one or more gas passages are configured to direct leaking gas toward one or more respective gas detectors. The manifold assembly also includes a flow control valve disposed within the manifold block between the inlet aperture and the one or more gas passages. The flow control valve is configured to maintain a closed state in which a component of the flow control valve engages in a sealing manner with the inlet aperture to preclude gas at the inlet aperture from flowing into the one or more gas passages—until said gas reaches a pressure corresponding to a pressure threshold. The manifold block further includes at least one aperture control plate having a substantially circular opening. The at least one aperture control plate is disposed substantially proximate to a lower end of the manifold block in substantial alignment with the inlet aperture of the manifold block. The aperture control plate is adapted to maintain the substantial circularity of the inlet aperture, to in turn ensure a substantially fluid-tight seal between the inlet aperture and the one or more gas passages until said gas reaches said pressure threshold.

The flow control valve may, in some implementations, include a one-way check valve. The one-way check valve may be a spring-biased ball type valve.

Some manifold assemblies may include a spring pocket adapted to maintain a spring. A coil spring may be disposed in the spring pocket. These manifold assemblies may also include a ball movably disposed between the coil spring and the inlet aperture. The ball may have a maximum diameter that is greater than a diameter of the inlet aperture. The coil spring may be configured to press the ball against the inlet aperture by a predetermined amount of force so as to maintain a substantially fluid-tight seal between the inlet aperture and the one or more gas passages. Gas pressure at the inlet aperture exerting a force against the ball that exceeds the predetermined amount of force causes the ball to move toward and compress the coil spring, thereby permitting gas to flow into the one or more gas passages.

In some embodiments, the inlet aperture has a first diameter, the substantially circular opening in the aperture control plate has a second diameter, where the first diameter is substantially the same as the second diameter and are operably aligned with each other. In other examples, the inlet aperture has a first diameter, the substantially circular opening in the aperture control plate has a second diameter, where the first diameter is smaller than the second diameter, so that an annular portion of the inlet aperture extends radially inward of said second diameter. The component of the fluid control valve is configured to press at least some of the annular portion into the substantially circular opening in the aperture control plate, to ensure the substantially fluid-tight seal between the inlet aperture and the one or more gas passages, until said gas reaches said pressure threshold.

In some embodiments of the invention, the at least one rigid aperture control plate is a bottom aperture control plate. In a preferred embodiment, the manifold assembly also includes a top aperture control plate. In this embodiment, the top aperture control plate includes an elongated cutout, and is disposed substantially proximate to a top end of the manifold block so as to substantially align the elongated cutout with the one or more gas passages. The top aperture control plate is also adapted to further maintain the substantial circularity of the inlet aperture.

The manifold assembly may also include a set screw disposed within the manifold block adjacent to the flow control valve. The set screw is operably adjustable to extend and retract toward and from a spring element of the flow control valve, thereby increasing and decreasing respectively the amount of force applied by the flow control valve against the inlet aperture.

The manifold block may be formed from an elastomeric material, such as a silicone material. The aperture control plate may be formed from a metallic material, such as stainless steel.

The aperture control plate may, in some instances, be integrally formed with the lower end of the manifold block. For example, the aperture control plate may be inserted into a silicone manifold block, and the aperture control plate may adhere to the silicone while it is being cured. The aperture control plate may also be disposed within the lower end of the manifold block such that a layer of elastomeric material at least partially covers the bottom surface of the aperture control plate.

The flow control valve may include a spring element that causes the component of the flow control valve to exert a first amount of force against inlet aperture. The pressure threshold is proportionate to the first amount of force, such that gas pressure that exerts an amount of force exceeding the first amount of force causes the flow control valve to open.

According to a second aspect of the present invention, there is provided a joint cover apparatus, for a ducting system for transporting high temperature pressurized gases, for covering a joint between abutting duct sections, wherein the ducting system is provided with a leak detection system using one or more temperature-responsive sensor wires. The joint cover apparatus includes a split joint cover body, operably configured to be expanded. The split joint cover body is positionable circumferentially around a joint between abutting duct sections and has an aperture therethrough, to permit the passage of gases emanating from the joint to a location external to the split joint cover body. The joint cover apparatus also includes at least one clamping mechanism, operably configured to releasably engage the split joint cover body, to cause the split joint cover body to be contracted around the joint. The joint cover apparatus also includes an elastomeric manifold block having a substantially circular inlet aperture and one or more gas passages having upper ends and fluidly coupled to the inlet aperture.

In these embodiments, the upper ends of said one or more gas passages are configured to direct leaking gas toward one or more respective gas detectors. The joint cover apparatus further includes a flow control valve disposed within the manifold block between the inlet aperture and the one or more gas passages. The flow control valve is configured to maintain a closed state in which a component of the flow control valve engages in a sealing manner with the inlet aperture to preclude gas at the inlet aperture from flowing into the one or more gas passages until said gas reaches a pressure corresponding to a pressure threshold. Additionally, the joint cover apparatus includes at least one aperture control plate having a substantially circular opening. The at least one aperture control plate is disposed substantially proximate to a lower end of the manifold block in substantial alignment with the inlet aperture of the manifold block. The aperture control plate is adapted to maintain the substantial circularity of the inlet aperture, to in turn ensure a substantially fluid-tight seal between the inlet aperture and the one or more gas passages until said gas reaches said pressure threshold.

The foregoing summary is illustrative only and is not intended to be in any way limiting. In addition to the illustrative aspects, embodiments, and features described above, further aspects embodiments, and features will become apparent by reference to the figures and the following detailed description and the accompanying drawings.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 5 is an elevated cross-sectional side view of an example manifold assembly, in which the diameter of the inlet aperture is smaller than the diameter of the aperture control plate opening;

FIG. 9 is an elevated cross-sectional side view of an example manifold assembly, in which a layer of elastomeric material covers the lower surface of the aperture control plate embedded therewithin;

DETAILED DESCRIPTION OF THE EMBODIMENTS

Figure 1:
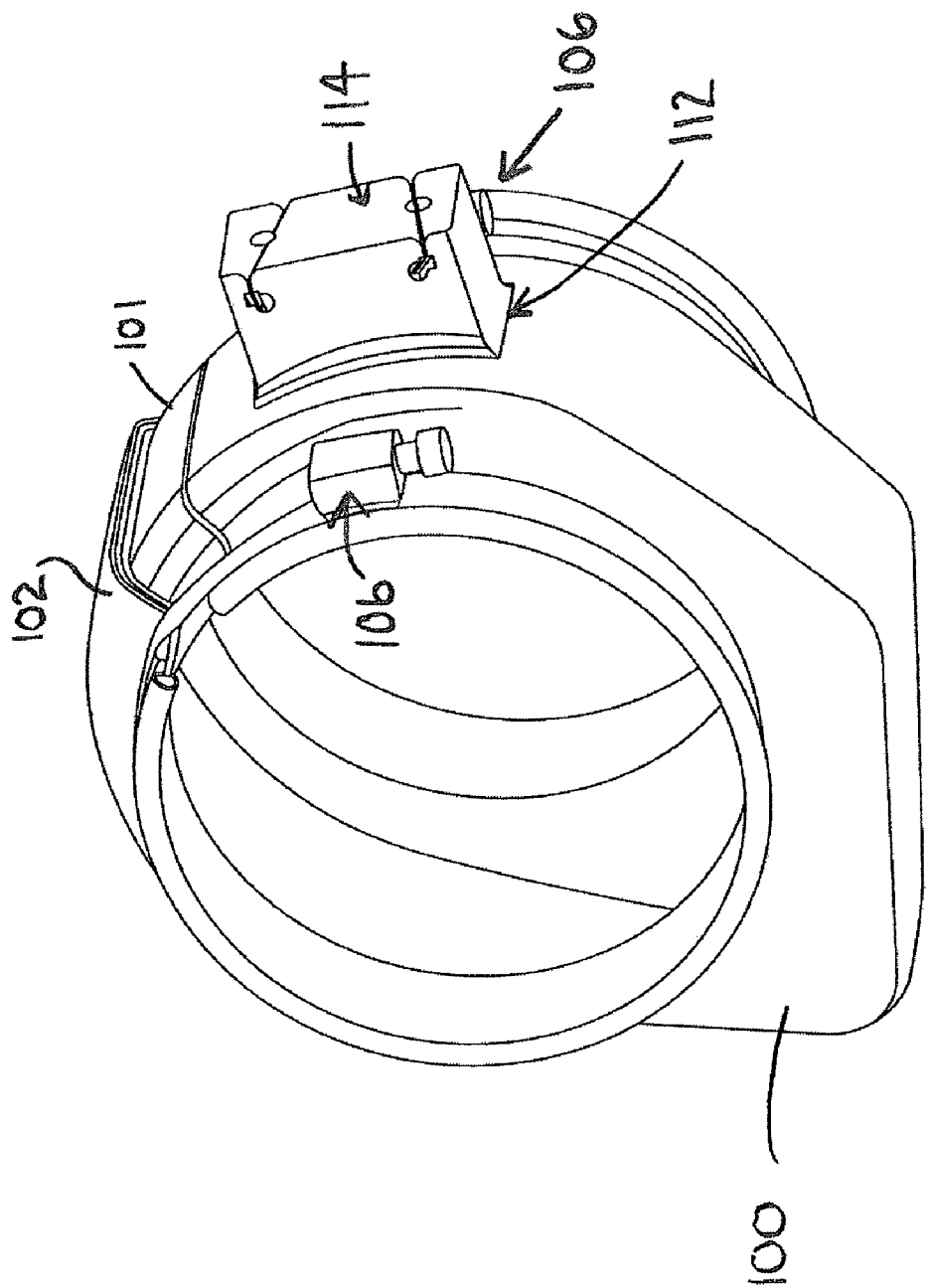
FIG. 1 is a perspective view of improved prior art embodiment of the invention showing a cuff/coupling cover with a conventional integrated manifold block.

There will now be described by way of examples, several specific modes of the invention as contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Leak detection devices of the present application may be integrated within a joint cover for a ducting system. When two separate ducts abut, an annular "cuff" may be secured around the joint. The two separate ducts may be secured together in various ways, such as with clamps or flanges. In some instances, the joint cover or cuff may protrude radially outward, forming an annular chamber that surrounds the joint. A joint cover may have integrated therein a manifold assembly that includes a flow control device—such as a check valve—that fluidly interfaces with this annular chamber.

Although the two separate ducts are intended to be adjoined in a sealing manner, so that gas passing from one duct to the other remains within the inner walls of the ducts, the adjoining means may not provide a complete seal that causes some gas to leak out from within the ducts into the annular chamber of the joint cover. As gas pressure builds within the annular chamber, an increasing amount of force may be applied against the flow control device. Once this force exceeds an amount of opposing force applied by the flow control device, that device may move into the manifold assembly and permit gas to flow through an inlet aperture of the manifold assembly and, in turn, into one or more gas passages within the manifold assembly.

The manifold assembly may be configured to maintain one or more temperature sensors positioned within or proximate to the one or more gas passages. In circumstances where the duct carries hot gas, such as hot exhaust gases, the temperature sensors detect the presence of gas passing through the one or more gas passages. In this manner, reading out the temperature measurements may serve as a basis for detecting a gas leak from the duct joint.

Leak detection devices described herein may utilize a check valve situated between an inner chamber of a joint cover and one or more gas passages fluidly coupled to temperature sensors. When pressure within the joint cover chamber exceeds a threshold pressure, gas therein may apply a force against the check valve that causes it to open or otherwise permit the flow of gas into the one or more gas passages. In some applications, such as aircraft ducting, the gas is hot relative to the environmental temperature. As this hot gas flows past the check valve and into the one or more gas passages, the temperature sensors are heated and thus detect the presence of the gas.

A check valve may operate by pressing an object against an aperture with some amount of pressure. For example, a check valve may include a spring that presses a ball against a substantially circular aperture or valve seat. In order to function properly, the dimensions of the ball complement the shape of the aperture, such that the ball pressing against the aperture forms an annular seal around the edge of the aperture.

If the dimensions of the ball does not fully complement the shape of the aperture, small gaps may exist that permit gas to flow past the check valve while it is in the closed position. For instance, where an aperture is either elliptical or ovoid as a result of either wear or manufacture, may preclude the ball from forming a complete seal around the aperture. In some cases, the material with which the aperture is constructed may deform, warp, expand, or otherwise change shape when subjected to high pressures, temperatures, and/or vibration. Even if the ball forms a complete seal around the aperture during manufacturing or testing, such deformation during operation can also result in unintended gas flow past the check valve in the closed position.

Some materials resist deformation or are less susceptible to thermal expansion. However, constructing a leak detection device using such materials may require expensive and overly-precise manufacturing. Other materials, including elastomers such as silicone, are flexible and compressible, allowing them to form a seal within some manufacturing tolerances. However, those materials may change shape under high temperatures and pressures.

Manifold assemblies described herein include a combination of compressible or flexible materials, and rigid or metallic materials. In some examples, a manifold body is constructed from an elastomer, such as silicone, that integrates therein one or more metal aperture control plates. A check valve ball may be seated within an elastomeric inlet aperture that is supported by and reinforced with a metal aperture control plate. As the ball presses into the aperture, the elastomer may compress, bend, or flex against the metal plate thereunder. A portion of the elastomer at the inlet aperture may conform to the opening of the metal plate, forming a seal at the interface of the ball and elastomer.

The combination of compressible and rigid materials cooperate with each other to provide a check valve seal that resists deformation under high temperatures and/or high pressures. The rigidity of an aperture control plate may help maintain the substantial circularity of an elastomeric inlet aperture, while the elastomer provides a flexible and compressible material against which the check valve can press to form a seal. Thus, the combination of metal and elastomer diminishes the drawbacks otherwise inherent in manifolds made of a single material.

In some implementations, multiple aperture control plates may be integrated within the manifold assembly, to further prevent deformation of the elastomer. Additional aperture control plates may also serve to maintain a consistent shape of the elastomer while it is being cured, during manufacture.

The conditions under which a manifold assembly is detecting a gas leakage may vary, depending on the specific system. Accordingly, some manifold assembly embodiments of the present invention include a set screw in mechanical communication with the check valve spring. As the set screw is turned, it extends into a pocket within which the spring is seated. The set screw may press against a plate or disk within this pocket, compressing the spring and increasing the amount of force that the ball presses against the inlet aperture. The set screw can likewise be retracted to decrease the spring bias or pressure. Such an arrangement permits an operator to adjust the force applied by the spring—and therefore the amount of gas pressure required to push the ball up and open the check valve—without having to disassemble or replace the manifold assembly.

As described herein, "heated," "hot," "chilled," "cooled," or any other term describing the temperature of a fluid or object refers to the relative temperature of that fluid with respect to a reference temperature, such as the temperature of the environment. The actual temperatures of gases and liquids may vary, depending upon the specific circumstances.

A typical duct assembly of the type with which the invention is intended to be used comprises an inner metal duct, typically composed of steel, and 1.00" to 6.50" in diameter, covered by an insulation blanket, and secured by an outer insulation shell. The insulation blanket and outer insulation shell are composed of materials as previously discussed.

A cuff may be positioned circumferentially around outer insulation shell of a duct assembly. Preferably, the cuff is composed of multiple plies of silicone rubber impregnated with fiberglass (to limit stretch), and, in the most preferred embodiment, three plies are used to avoid having the cuff rupture due to excessive pressure build-up when installed in situ around the duct assembly. Before securing the cuff to the duct assembly, an outer insulation shell may be cut circumferentially around the duct assembly. A small amount of an outer insulation shell may also be removed to form a narrow gap in the outer insulation shell.

To secure the cuff to the duct assembly, the cuff may be situated circumferentially around the portion of the duct assembly in which the cut in the outer insulation shell has been made, with a tongue and groove arrangement at the ends of the cuff.

The cuff may include a raised middle portion and shoulders on either side thereof. Shoulders will rest against outer insulation shell of duct assembly while raised middle portion remains above insulation shell thereby defining an annular-shaped void thereunder. The cuff is secured to the duct by wrapping the shoulders and the adjoining area of the outer insulation shell with a heat-resistant, silicone-rubber compound tape. One example of an appropriate heat-resistant, silicone-rubber tape is sold under the tradename MOX-Tape™ and manufactured by Arlon Corporation of Santa Ana, Calif. In lieu of heat resistant tape, any known method of securing cuff to duct assembly may be used, as long as the passage of air through insulation layer to the void under cuff is not restricted. The cuff should be situated on the duct assembly such that hole is in a convenient orientation with respect to the position of existing sensor wires such that air escaping hole will impinge on both of the sensor wires. Because pressures within the inner metal portion of duct assembly can reach substantially high pressures, it can be expected that pressure within the void created between cuff and duct assembly may also experience some fraction of that substantial pressure. As a result, it is possible that the middle portion of cuff may deform because of bowing due to pressure buildup in the void inside cuff. As a result, it is also possible that hole may not direct the air escaping therefrom to impinge onto sensor wires when middle portion of cuff is deformed.

In ducting structures of the type described herein, the specifications for the ducts allow for a small amount of leakage, particularly at the locations where the two sections of duct are joined together by a coupling. Accordingly, in order to prevent false alarms resulting from such small, accounted for leakage, it is desirable to provide a way to prevent leaking gases from reaching the highly sensitive temperature sensing wires, unless and until the volume and/or pressure of the leaking gases exceed a preselected value.

Therefore, coupling covers employed in accordance with the principles of the present invention, particularly those covering duct couplings, may be provided with a check valve, which is biased in a closed position, against leakage gas pressures which are below a preselected threshold level.

Prior art coupling cover 100 is shown in perspective view in FIG. 1, in the form of a split ring, having, at the split, a first inner portion 101 that is overlapped by a second outer portion 102 in the vicinity of the split. First inner portion 101 has wedge-shaped or ramp-shaped outer contours. Coupling cover 100 is held in place by band clamps 106. Each band clamp may be in the form of a conventional hose-type clamp, having a band 108, and a screw drive section 110. As band clamps 106 are tightened, second outer portion 102 is forced to ride up first inner portion 101, creating a binding fit, so as to inhibit the leakage of gases therebetween. Coupling cover 100 is preferably fabricated from a silicone rubber impregnated fiberglass cloth, which may be pre-molded, and cured in a temperature-controlled environment. Opening 112 in coupling cover 100 permits manifold block 114 to be inserted therethrough from the inside, and held in place, e.g., by an RTV ("Room Temperature Vulcanization") adhesive. In preferred embodiments of the invention, coupling cover 100 is fabricated from the same material and cured in the same manner as the cuff.

Figure 2:
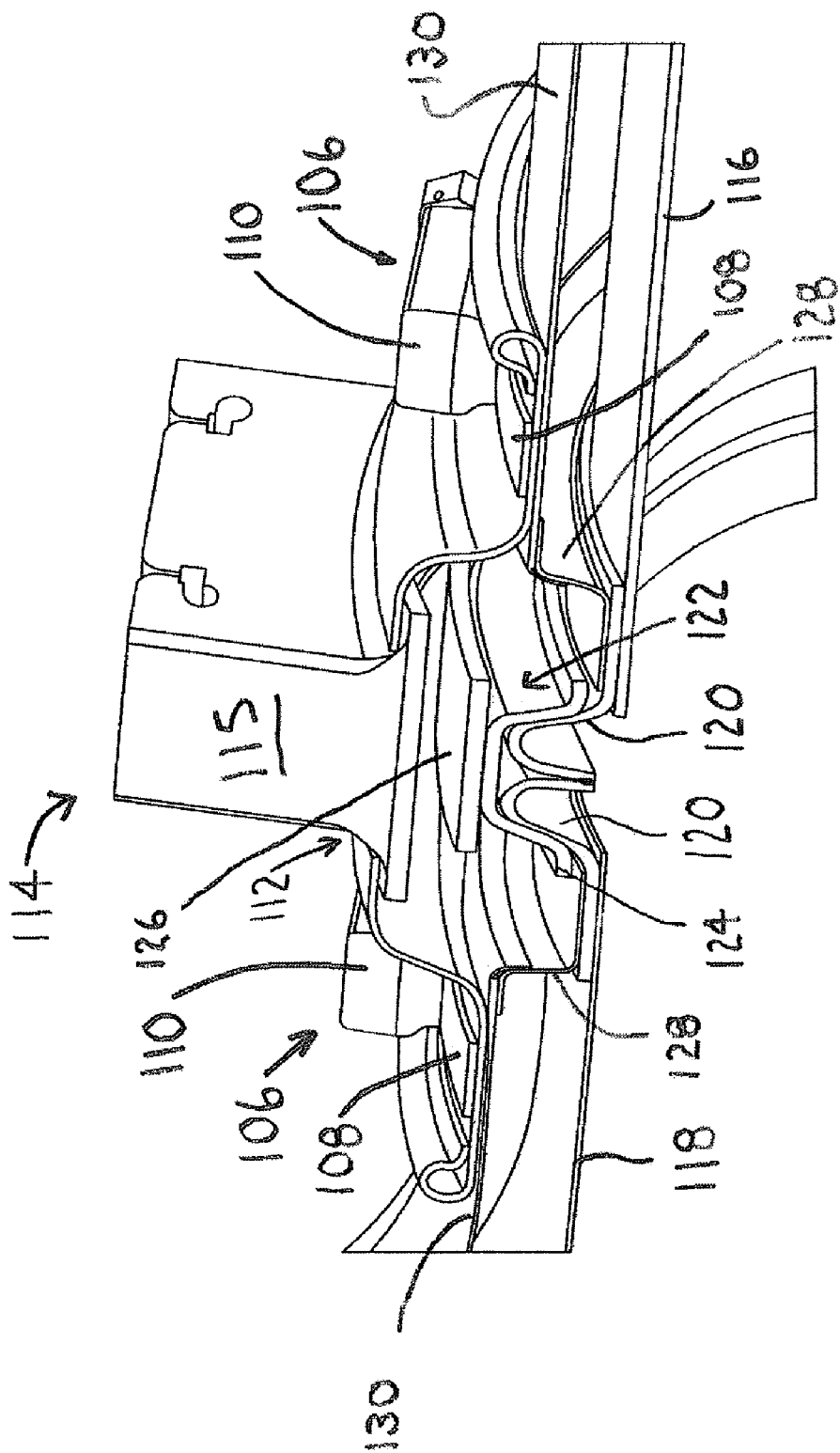
FIG. 2 is an enlarged perspective view, in section, of the cuff/coupling cover with the conventional integrated manifold block, according to the prior art embodiment of FIG. 1.

FIG. 2 is a lengthwise or longitudinal sectional view of a prior art duct joint surrounded by a coupling cover 100. Duct sections 116, 118 are connected to one another by joint flanges 120 affixed to the ends of the respective duct sections 116, 118. Joint flanges 120 are, in turn, held together by V-band coupling 122, formed from V-band 124 and strap 126. V-band coupling will have a screw drive section (not shown), such as used with band clamps 106, to tighten strap 126, to create radially inwardly directed clamping pressure against flanges 120. Standoffs 128 are used to provide radial spacing between duct sections 116, 118, and insulation shells 130. Insulation (not shown) may typically be provided in the annular gap between insulation shells 130 and duct sections 116, 118.

FIGS. 3-12 illustrate various views of example manifold assemblies and components therein of the present invention. These views may or may not be drawn to scale, and are provided for explanatory purposes. For example, actual aperture control plates may be thinner or thicker relative to other portions of the manifold assembly; however, those aperture control plates are drawn with sufficient thickness to be illustrated in the figures. One of ordinary skill would appreciate that the dimensions of the components in the figures are intended to help facilitate understanding of the manifold assembly, and may or may not necessarily reflect the physical geometry or proportions in actual implementations.

Figure 3:
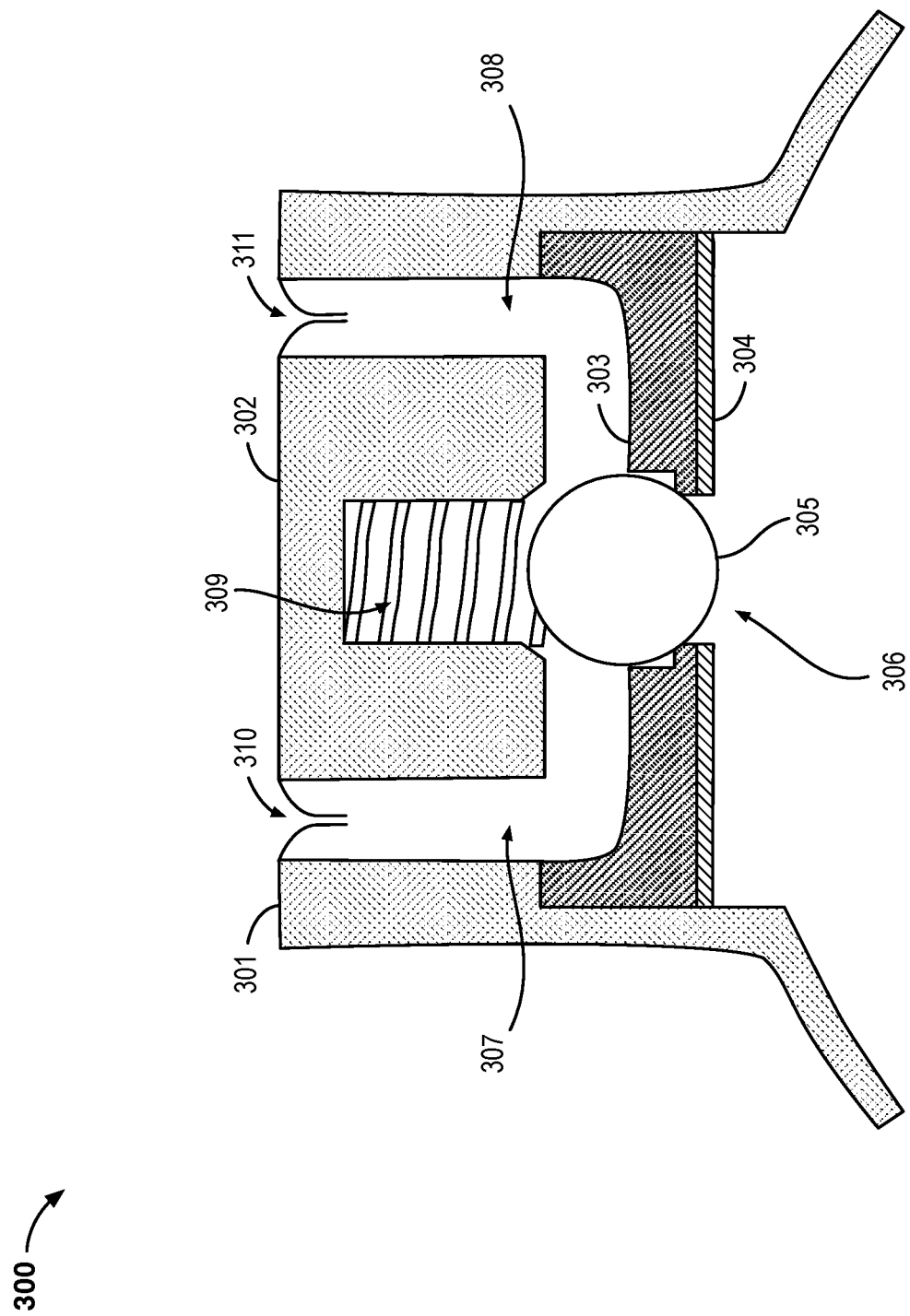
FIG. 3 is an elevated cross-sectional side view of an example of the present invention.

FIG. 3 is an elevated cross-sectional side view of an example manifold assembly 300. Manifold assembly 300 includes body 301-302, which include voids therein that define gas passages 307 and 308, a pocket within which spring 309 is maintained, and an inlet aperture 306. Body 301-302 may be a continuous elastomeric housing, or may be two or more separate pieces that are fixed relative to each other. The inlet aperture 306 may serve as a seat for ball 305 which, under some conditions, maintains a seal preventing gas from flowing through inlet aperture 306 and into gas passages 307 and 308. Spring 309 may be situated above the ball and opposite to inlet aperture 306, so as to provide a downward force against ball 305.

Manifold assembly 300 also includes manifold block 303, together with aperture control plate 304. Manifold block 303 may be formed from an elastomeric material, and may include grooves or depressions extending longitudinally on opposite sides of ball 305. Manifold block 303 includes an substantially cylindrical inlet aperture within which ball 305 is seated. Manifold assembly 300 also includes aperture control plate 304, which includes an opening proximate to inlet aperture 306. Aperture control plate 304 may be adhered to or integrated with the lower end of manifold block 303, such that an opening of aperture control plate 304 is substantially in alignment with the inlet aperture 306. Aperture control plate 304 may be formed from a rigid metal material, such as stainless steel.

As shown in FIG. 3, inlet aperture 306 of manifold block 303 varies in diameter along the vertical axis. At the upper end near gas passages 307 and 308, the diameter of inlet aperture 306 is wider, compared to the diameter of inlet aperture 306 at the lower end near aperture control plate 304. The narrower diameter near the bottom of inlet aperture 306 may allow ball 305 to compress a portion of the manifold block 303 against aperture control plate 304. The portion of manifold block 303 compressed between ball 305 and aperture control plate 304 forms a seal that prevents gas from flowing into gas passages 307 and 308, until the bias of spring 309 is overcome to urge ball 305 upwardly. As described herein, the "inlet aperture" may generally refer to the bottom portion of the substantially cylindrical void of manifold body 303 against which ball 305 presses.

During operation, gas pressure may build up in a chamber situated below ball 305. Once that gas pressure exerts enough force to overcome the force of spring 309, ball 305 moves upwardly toward the pocket in which spring 309 is maintained. Once this seal between ball 305 and manifold block 303 has been disengaged, some of the built up gas flows into gas passages 307 and 308 and up toward channels 310 and 311, respectively. Channels 310 and 311 may be configured to maintain temperature sensors (e.g., thermocouples, temperature-sensitive wires, etc., not illustrated in FIG. 3) capable of detecting the presence of heated gas at channels 310 and 311. Channels 310 and 311 may also permit gas to vent into the surrounding aircraft environment, for example, in a wing or fuselage, depending upon the specific implementation.

Techniques other than temperature sensing may be used to detect the presence of gas within the manifold. For example, pressure transducers secured to channels 310 and 311 may modulate when gas flows in gas passages 307 and 308. Other types of sensors may also be used to detect the presence of gas, which utilize electrochemical processes, sense photoionization, detect infrared light, and semiconductors whose impedance modulates in the presence of certain gases, ultrasonic transducers that detect the flow rate of gases, among other types of sensors. Although embodiments described herein refer to temperature sensing methods, one or ordinary skill would appreciate that a variety of sensing techniques may be used to detect the presence of gas.

In some implementations, manifold body 301 and manifold block 303 are integrally formed. In other implementations, manifold block 303 is a separate element that is inserted into or adhered to manifold body 301. Although manifold body 301 and manifold block 303 are drawn with different shading in FIG. 3, manifold body 301 and manifold block 303 may be formed from a single piece of material (e.g., silicone cured in a manifold body mold).

Figure 4:
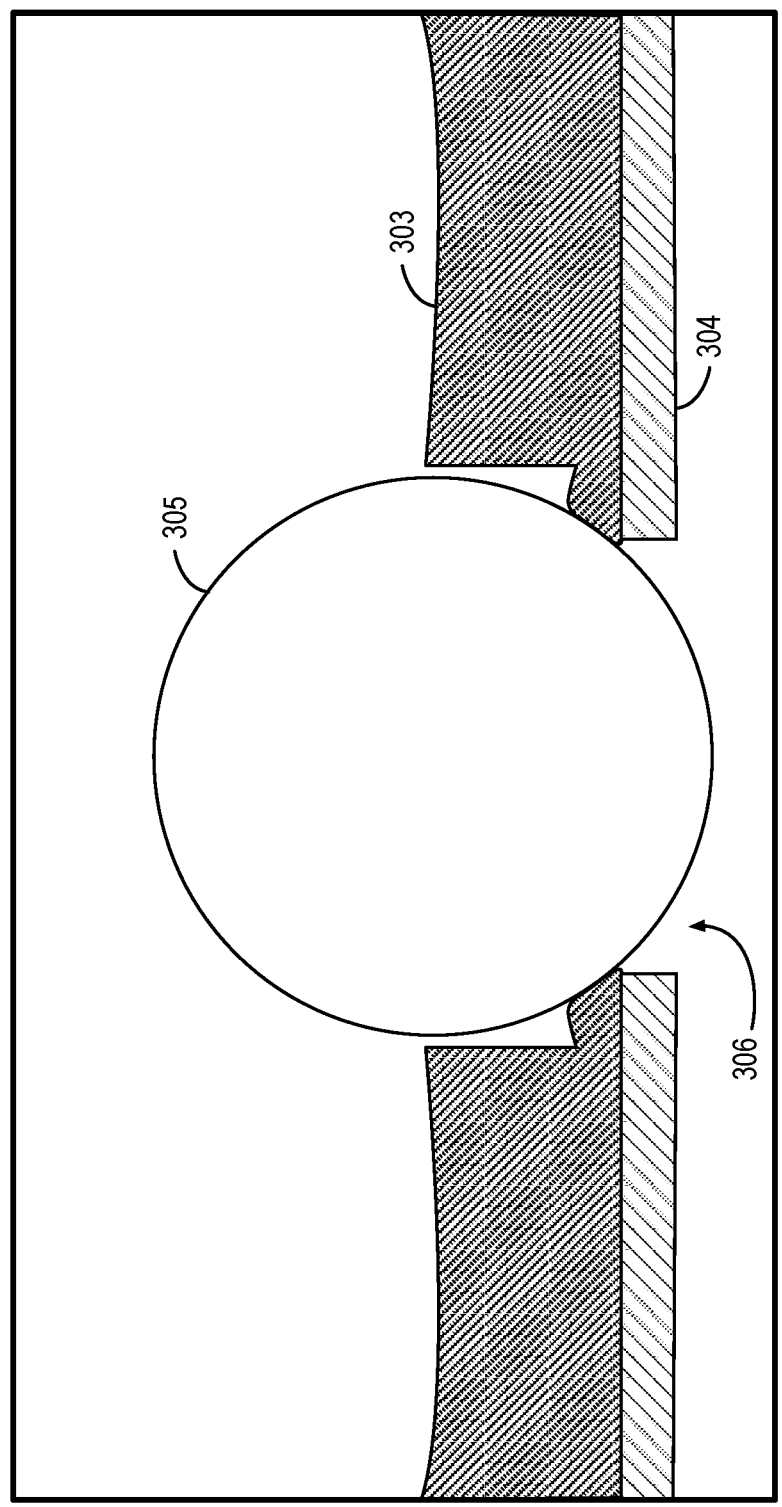
FIG. 4 is an enlarged, elevated cross-sectional view of the example manifold assembly of the present invention showing compression of a portion of the valve seat aperture, according to the embodiment of FIG. 3.

FIG. 4 is an enlarged cross-sectional view of manifold assembly 300 in FIG. 3, focusing on the inlet aperture 306 region. As illustrated in FIG. 4, the lower portion of manifold 303 forming the inlet aperture 306 compresses against aperture control plate 304. As a result of the spring force applied against ball 305, the compressed portion of inlet aperture 306 conforms to the shape of ball 305. In this manner, the compressed portion of inlet aperture 306 forms a seal between the opening of aperture control plate 304 and ball 305, thereby preventing gas from flowing into gas passages 307 and 308.

The specific shape and dimensions of the inlet aperture may or may not be drawn proportionally, and may not represent the actual shape of the compressed material. Any inaccuracies or exaggerations are provided for explanatory purposes, to show how an elastomer compresses between ball 305 and aperture control plate 304 to form a seal.

FIG. 5 is an elevated cross-sectional side view of an example manifold assembly 500, which is similar to manifold assembly 300 shown in FIG. 3. However, in FIG. 5 the diameter of the opening of aperture control plate 504 is larger than of aperture control plate 304. As shown in FIG. 5, the diameter of inlet aperture 506 is less than the diameter of the opening of aperture control plate 504. As a result, an annular ring 601 of elastomer from manifold block 503 extends radially inward, past the lip 504a of the opening of aperture control plate 504.

Figure 6A:
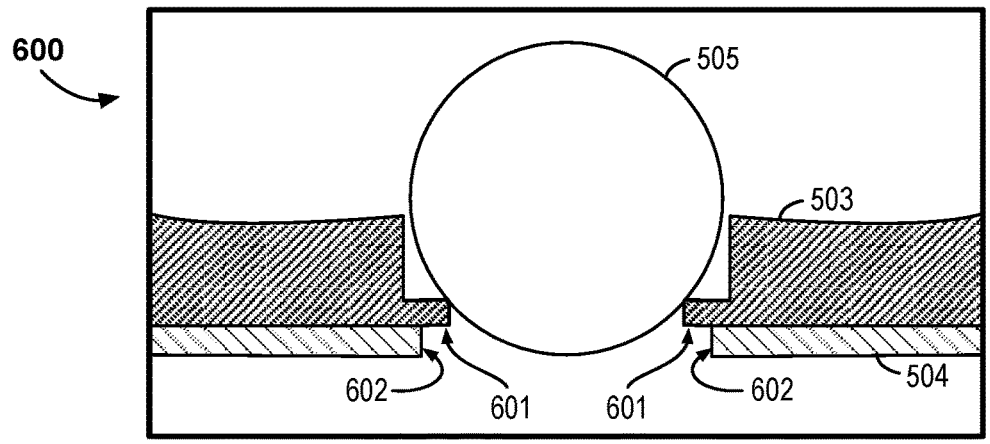
FIG. 6A is an elevated cross-sectional side view of the example manifold assembly showing the first sequential view of compression of a portion of the inlet aperture with a valve ball at a first position, according to the embodiment of FIG. 5.
Figure 6B:
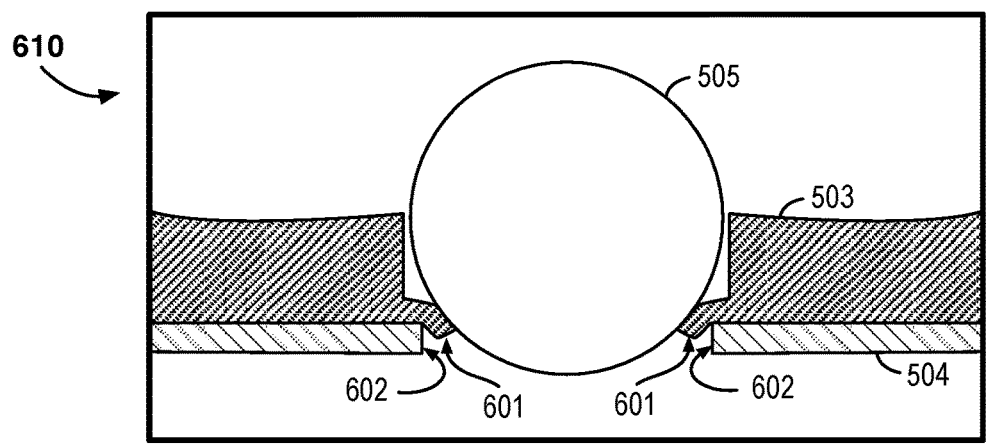
FIG. 6B is an elevated cross-sectional side view of the example manifold assembly showing compression of a portion of the inlet aperture with the valve ball at a second position, according to the embodiment of FIG. 5.
Figure 6C:
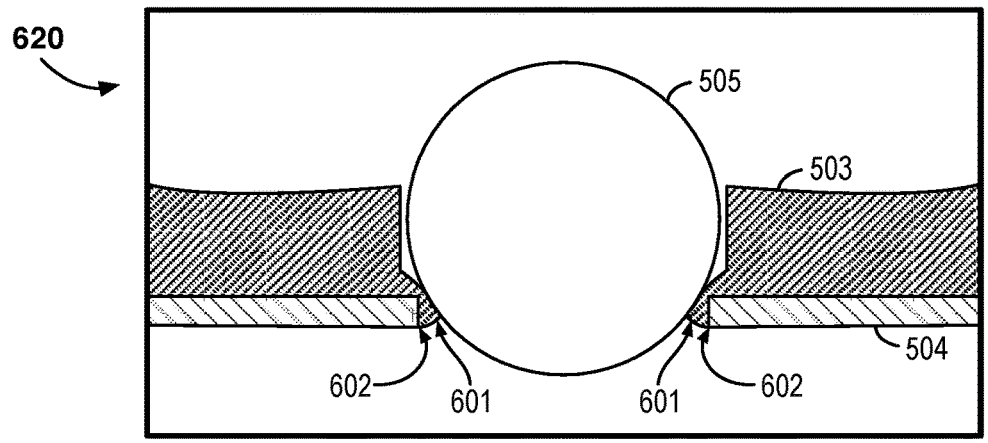
FIG. 6C is an elevated cross-sectional side view of the example manifold assembly showing compression of a portion of the inlet aperture with the valve ball at a third position, according to the embodiment of FIG. 5.

Depending on the downward force applied by the spring onto ball 505, annular ring 601 of manifold block 503 may deform and migrate downwardly into the opening of aperture control plate 504. FIGS. 6A-6C illustrate different stages of this migration for manifold assembly 500 in FIG. 5.

In FIG. 6A, ball 505 is in a first position and applies little or no downward force onto annular portion 601 of elastomer, such that little or no migration into opening 602 occurs. At stage 600, annular portion 601 extends radially inward past the outer circumference of opening 602, but does not extend downward into opening 602.

In FIG. 6B, ball 505 is in a second position and applies some downward force onto annular portion 601 of elastomer, causing partial migration into opening 602. At stage 610, annular portion 601 partially deforms or warps, conforming to the shape of ball 505 and forming a seal. An upward force produced by gas pressure, for example, may cause ball 505 to move upward toward or above the first position shown at stage 600, allowing gas to flow between a narrow passageway between ball 505 and annular portion 601.

In FIG. 6C, ball 505 is in a third position and applies an even greater downward force onto annular portion 601 of elastomer, causing even greater migration into opening 602. At stage 620, annular portion 601 deforms and compresses, conforming to the shape of ball 505 and extending to the lower surface of opening 602. As a result, a seal between ball 505 and annular portion 601—reinforced by aperture control plate 504—is formed. A sufficiently strong upward force produced by gas pressure, for example, may cause ball 505 to move upward toward or above the first position shown at stage 600, allowing gas to flow between a narrow passageway between ball 505 and annular portion 601.

Stages 600, 610, and 620 of elastomeric deformation at the inlet aperture 506 may not necessarily be drawn to scale. Some aspects of FIGS. 6A-6C may be exaggerated for explanatory purposes to illustrate the migration of annular portion 601 into opening 602. The actual manner of deformation, compression, and/or migration of elastomer may depend on the particular elastomer used and the specific dimensions of the manifold assembly.

Figure 7:
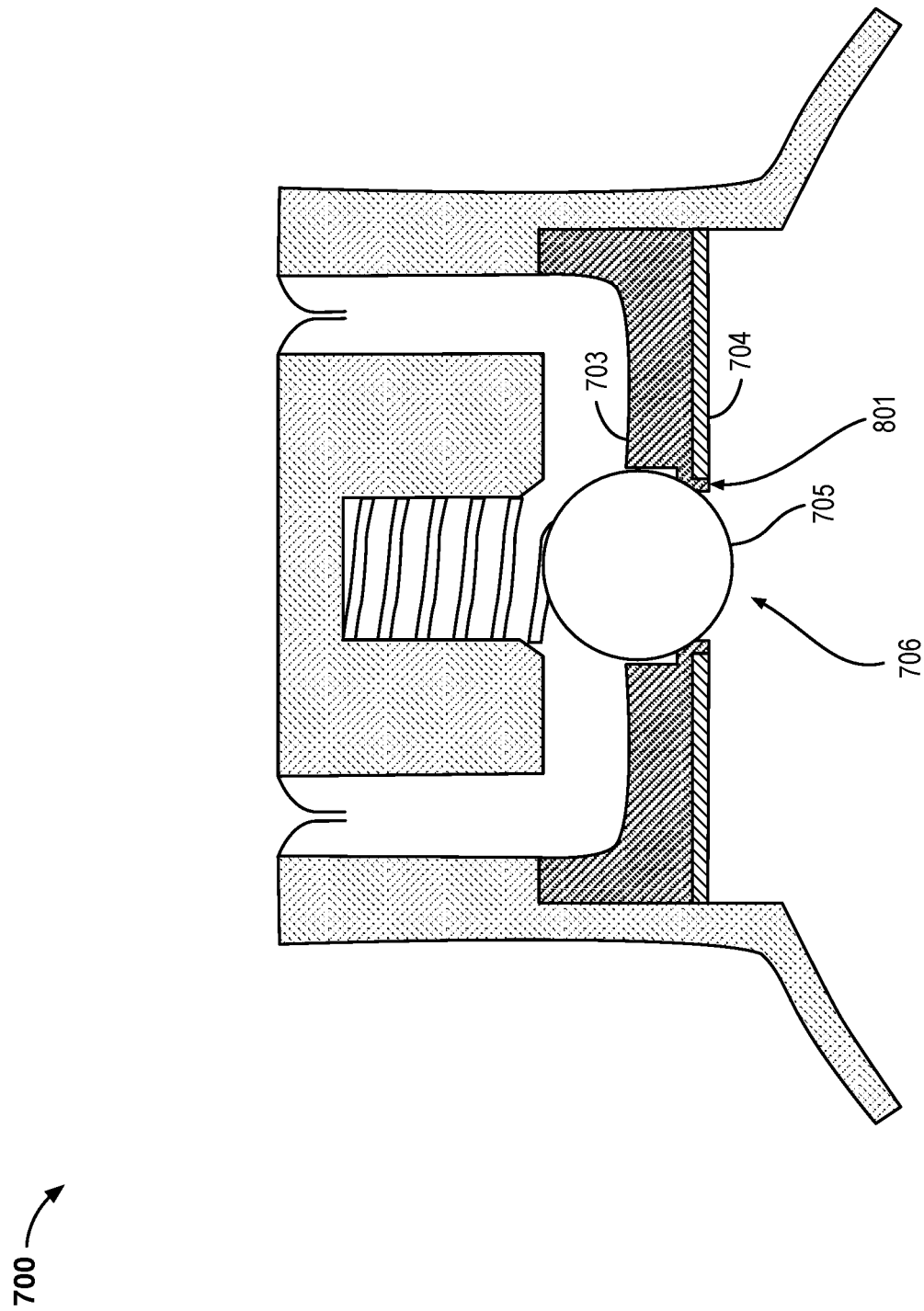
FIG. 7 is an elevated cross-sectional side view of an example manifold assembly, in which an annular portion of the inlet aperture extends into the aperture control plate opening.

FIG. 7 is an elevated cross-sectional side view of an example manifold assembly 700, which is similar to manifold assembly 300 shown in FIG. 3. In FIG. 7, the diameter of the opening of aperture control plate 704 is larger than that of aperture control plate 304. Additionally, the elastomer at the inlet aperture 706 extends downward into the opening of aperture control plate 704, such that an annular ring of elastomeric material lines the circumference of the opening, prior to the exertion of pressure by ball 705 against manifold assembly 700.

Figure 8A:
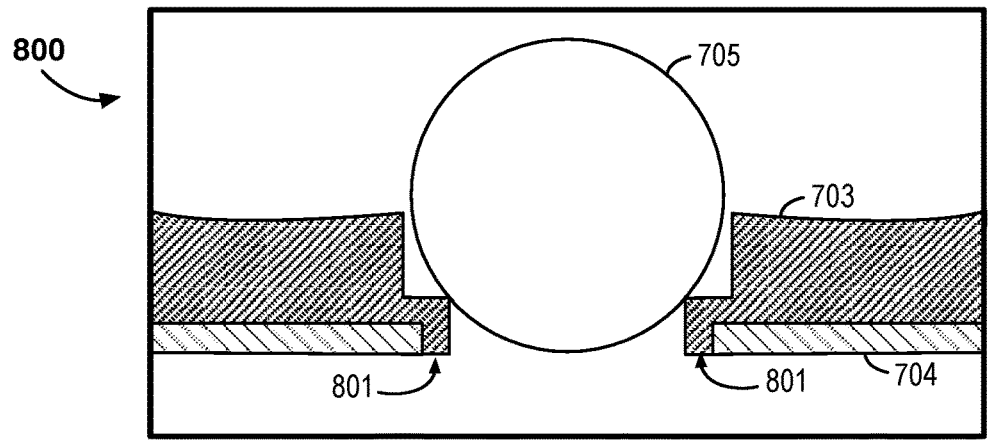
FIG. 8A is an elevated cross-sectional side view of the example manifold assembly showing compression of a portion of the inlet aperture with a ball at a first of three sequential positions, according to the embodiment of FIG. 7.
Figure 8B:
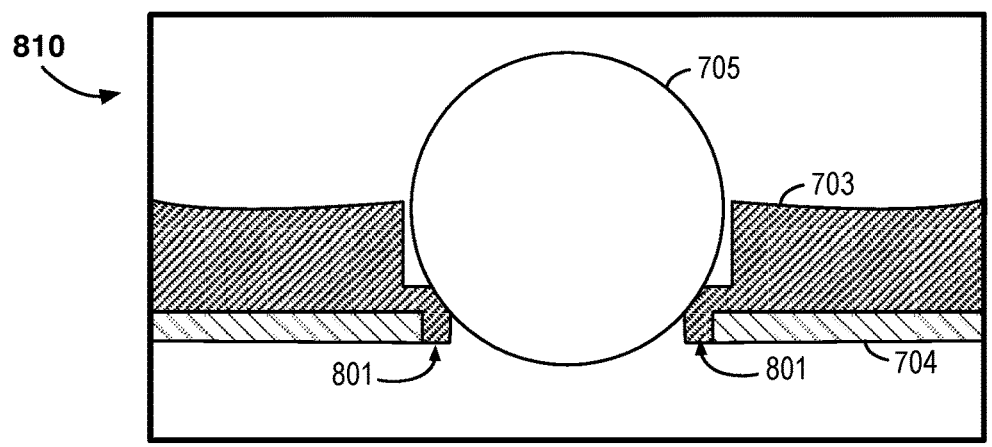
FIG. 8B is an elevated cross-sectional side view of the example manifold assembly showing compression of a portion of the inlet aperture with the ball at a second position, according to the embodiment of FIG. 7.
Figure 8C:
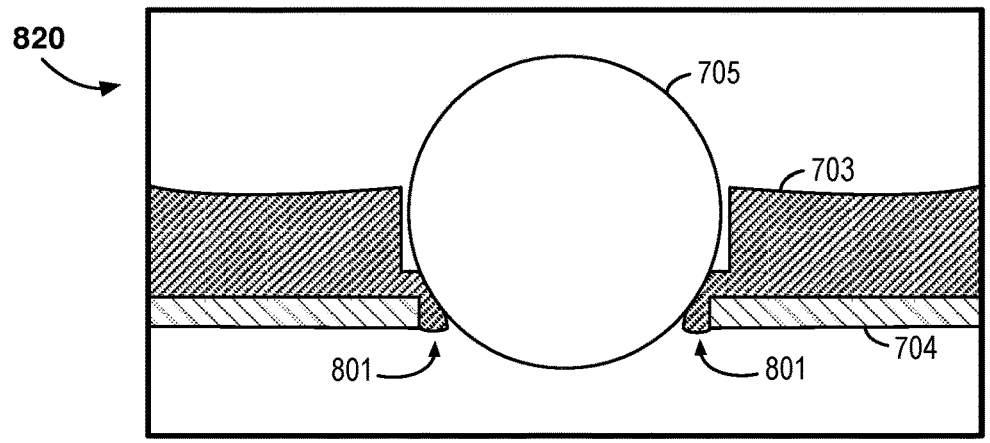
FIG. 8C is an elevated cross-sectional side view of the example manifold assembly showing compression of a portion of the inlet aperture with the ball at a third position, according to the embodiment of FIG. 7.

Depending on the downward force applied by the spring onto ball 705, this annular ring of elastomer may likewise deform, and compress against the opening of aperture control plate 704. FIGS. 8A-8C illustrate different stages of this migration for manifold assembly 700 in FIG. 7.

In FIG. 8A, ball 705 is in a first position and applies little or no downward force onto annular portion 801 of elastomer, such that little or no compression between ball 705 and aperture control plate 704 occurs. At stage 800, annular portion 801 is substantially not compressed, which may form a thin seal between the upper edge of annular portion 801 and ball 705.

In FIG. 8B, ball 705 is in a second position and applies some downward force onto annular portion 801 of elastomer, causing partial compression against aperture control plate 704. At stage 810, annular portion 801 partially deforms and compresses against aperture control plate 704, conforming to the shape of ball 705 and forming a seal. An upward force produced by gas pressure, for example, may cause ball 705 to move upward toward or above the first position shown at stage 800, allowing gas to flow between a narrow passageway between ball 705 and annular portion 801.

In FIG. 8C, ball 705 is in a third position and applies an even greater downward force onto annular portion 801 of elastomer, causing even greater compression against aperture control plate 704. At stage 820, annular portion 801 deforms and compresses, conforming to the shape of ball 705. As a result, a seal between ball 705 and annular portion 801—reinforced by aperture control plate 704—is formed. A sufficiently strong upward force produced by gas pressure, for example, may cause ball 705 to move upward toward or above the first position shown at stage 800, allowing gas to flow between a narrow passageway between ball 705 and annular portion 801.

Stages 800, 810, and 820 of elastomeric deformation at the inlet aperture 706 may not necessarily be drawn to scale. Like FIGS. 6A-6C, some aspects of FIGS. 8A-8C may be exaggerated for explanatory purposes to illustrate the compression of annular portion 801 against aperture control plate 704. The actual manner of deformation and/or compression of elastomer may depend on the particular elastomer used and the specific dimension of the manifold assembly.

FIG. 9 is a cross-sectional side view of an example manifold assembly 900, which is similar to manifold assembly 300 shown in FIG. 3. However, in FIG. 9 aperture control plate 904 is embedded within the lower portion of manifold block 903, to expose assembly portion 903a beneath. When bonding manifold block 903 to its final position within the main manifold body, another layer of silicone may be used. This layer of silicone may bond better to layer 903a than to aperture control plate 904.

Figure 10:
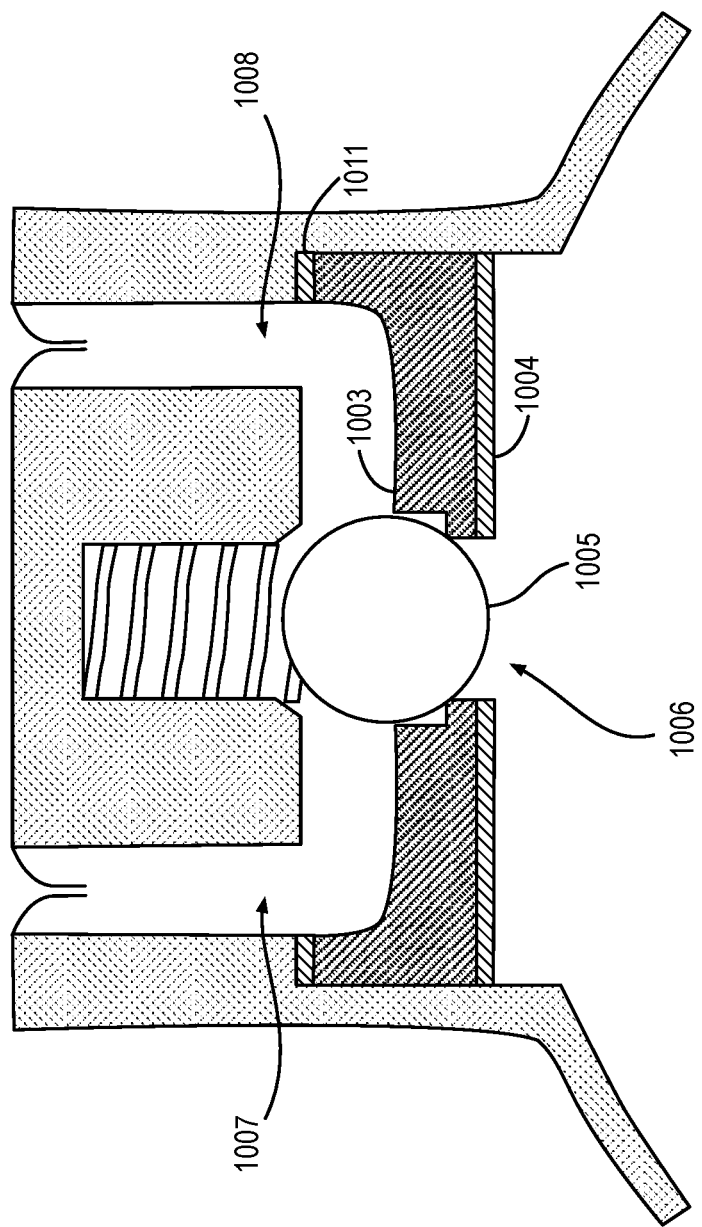
FIG. 10 is an elevated cross-sectional side view of an example manifold assembly with two aperture control plates.

FIG. 10 is a cross-sectional side view of an example manifold assembly 1000, which is similar to manifold assembly 300 shown in FIG. 3. However, in FIG. 10, manifold assembly 1000 includes two aperture control plates: top aperture control plate 1011 and bottom aperture control plate 1004. Similar to bottom aperture control plate 1004, top aperture control plate 1011 provides additional rigidity and support to manifold block 1003, resisting deformation and warping that might otherwise occur in a fully elastomeric manifold assembly.

Just as bottom aperture control plate 1004 serves to maintain the substantial circularity of inlet aperture 1006, top aperture control plate 1011 may also serve to maintain the shape of the upper end of manifold block 1003. In some instances, it may be desired to maintain the shape of the upper end of manifold block 1003 to ensure that ball 1005 travels in a substantially upward direction, without being biased toward gas passage 1007 or gas passage 1008. Top aperture control plate 1011 may also serve to maintain the shape of manifold block gas passages, and to prevent biasing of ball 1005. Preventing biased flow may be desired in implementations where sensors within gas passages 1007 and 1008 require parity or mirrored measurements.

Figure 11:
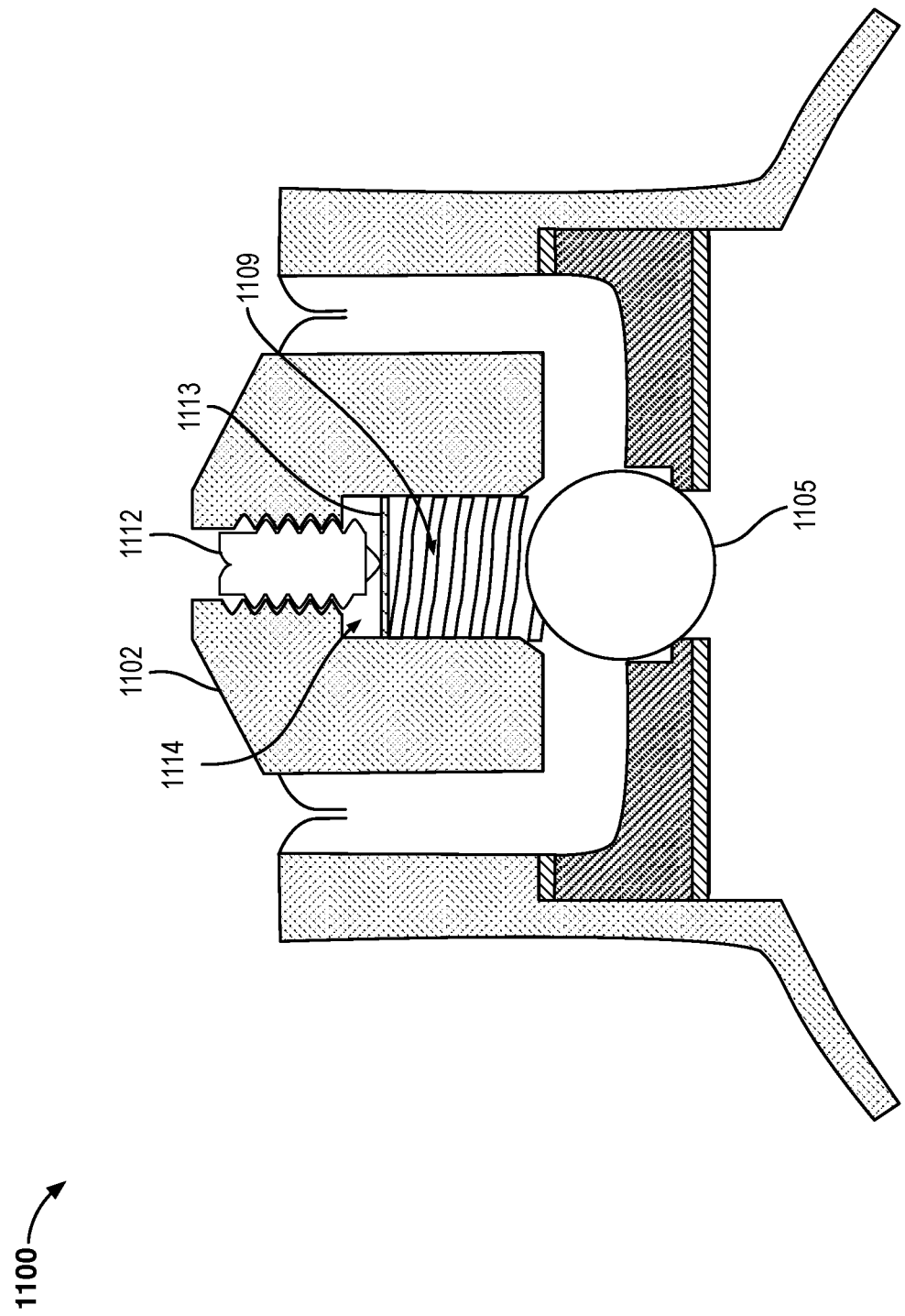
FIG. 11 is an elevated cross-sectional side view of an example manifold assembly with a set screw for adjusting the compression of the valve spring.

FIG. 11 is a cross-sectional side view of an example manifold assembly 1100, which is similar to manifold assembly 900 shown in FIG. 9. However, manifold assembly 1100 also includes set screw 1112 and spring disk 1113. In this example, manifold body 1102 includes screw threading disposed above spring pocket 1114 within which spring 1109 is maintained. As set screw 1112 is rotated in one direction, the lower end of set screw 1112 extends downwardly into spring pocket 1114, causing spring disk 1113 to move downward, to increase the spring bias. Likewise, as set screw 1112 is rotated in the opposite direction, the lower end of set screw 1112 retracts upwardly from spring pocket 1114, causing spring disk 1113 to move upward, to decrease the spring bias. Spring disk 1113 contacts spring 1109, and its position serves to set the rest compression length of spring 1109. In this manner, set screw 1112 permits the strength of the spring force against ball 1105 to be adjustable—for selection as desired depending upon a desired gas pressure threshold.

Figure 12B:
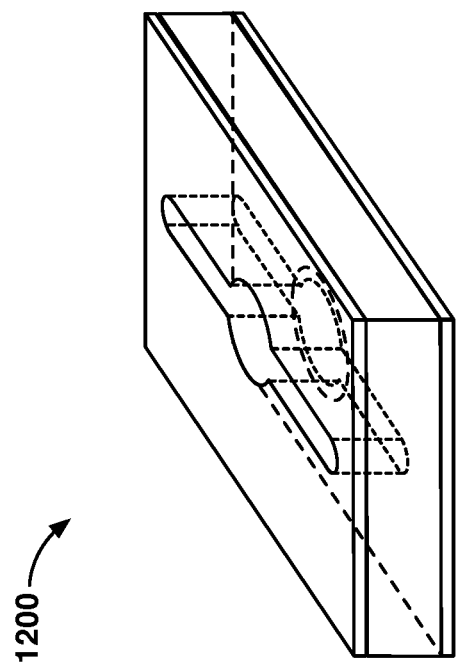
FIG. 12B is perspective view of the example manifold insert, partially in phantom, according to the embodiment of FIG. 12A showing the void defining one or more gas passages.
Figure 12A:
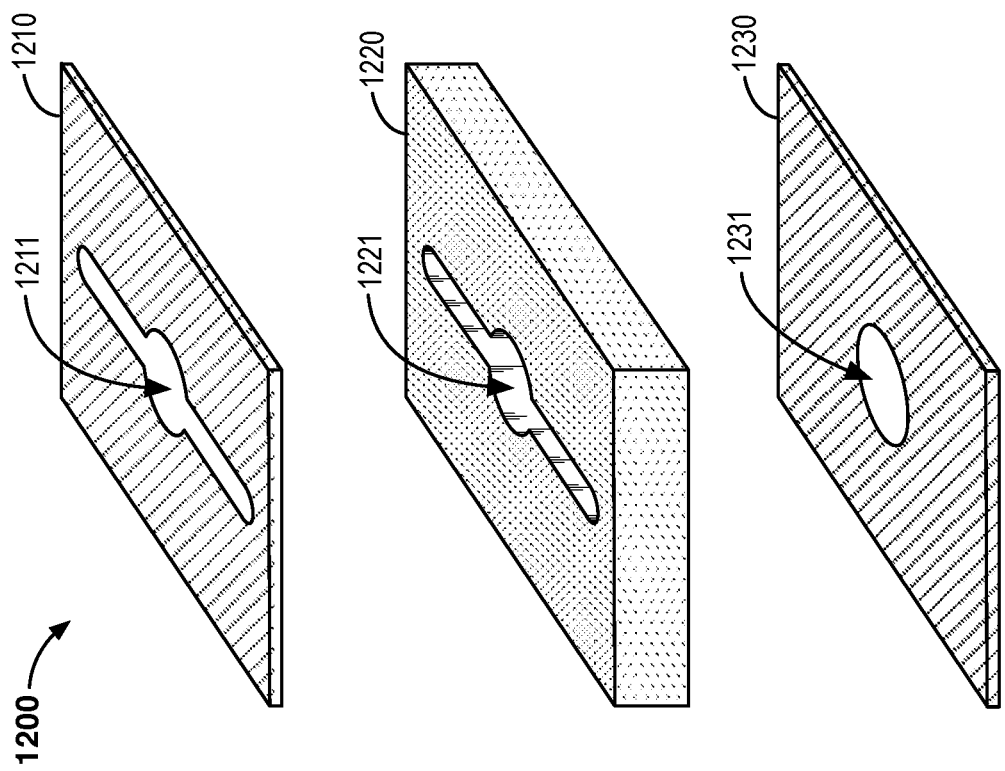
FIG. 12A is an exploded perspective view of an example manifold insert.

FIG. 12A is an exploded perspective view of an example manifold insert 1200. Manifold insert 1200 includes top aperture control plate 1210, manifold block 1220, and bottom aperture control plate 1230. Top aperture control plate 1210 includes a void 1211 shaped as a circle with elongated arms extending longitudinally therefrom, to accommodate the gas passages. Manifold block 1220 includes void 1221 that at least partially defines one or more gas passages within a manifold assembly, which are shaped substantially similarly to void 1211 and are aligned with void 1211. Bottom aperture control plate 1220 includes a substantially circular opening 1231 which is substantially in alignment with the cylindrical portion of void 1221.

FIG. 12B is an assembled perspective view of an example manifold insert 1200 with two elongated voids extending longitudinally along the manifold insert 1200 to partially define gas passages. The circular or cylindrical void at the center of manifold insert 1200 may serve as a seat for a check valve ball.

Figure 13:
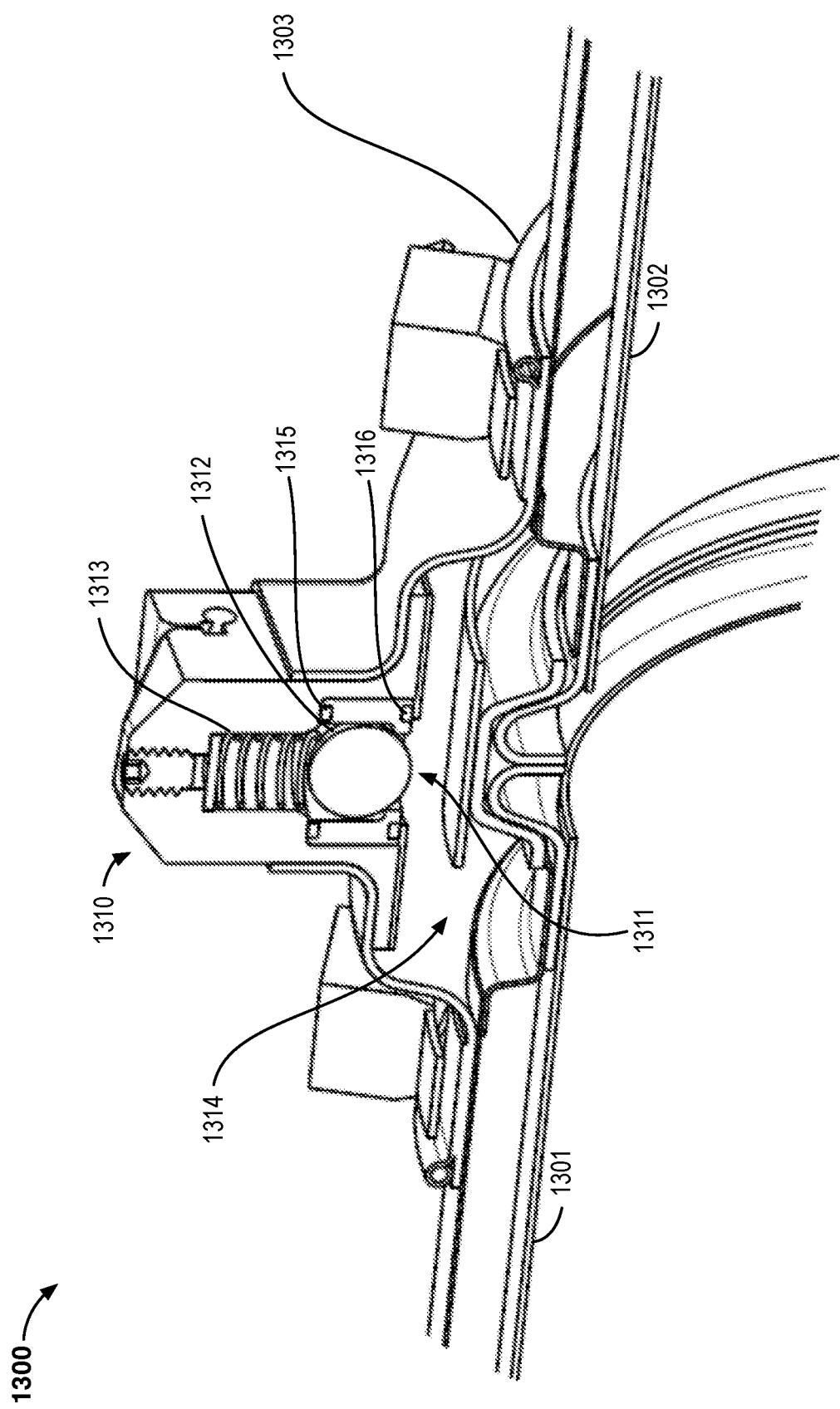
FIG. 13 is an enlarged cross-sectional perspective view of an example manifold assembly integrated with a joint cover for a duct leak detection system.

FIG. 13 is a front cross-sectional perspective view 1300 of an example manifold assembly 1310 integrated with a joint cover 1303 for a ducting system. The ducting system includes duct 1301 abutting against 1302, which are joined together with a clamp or flange. Joint cover 1303 surrounds this joint, which forms an annular chamber 1304 around the joint. Manifold assembly 1310 is integrated with the joint cover 1303, having an inlet aperture 1311 in fluid communication with annular chamber 1304. Also shown are top aperture control plate 1315 and bottom aperture control plate 1316.

As gas pressure leaking from within ducts 1301 and 1302 fill annular chamber 1314, gas pressure increases therewithin. Once that gas pressure exerts enough force against ball 1312 to overcome the opposite force applied by spring 1313 against ball 1312, ball 1312 moves upwardly to permit gas to flow through inlet aperture 1311. Elongated gas passages (disposed in front and behind ball 1312 from the perspective shown in FIG. 13, and not illustrated in FIG. 13) direct that gas toward the one or more gas sensors.

Although certain example methods and apparatus have been described herein, the scope of coverage of this patent is not limited thereto. On the contrary, this patent covers all methods, apparatus, and articles of manufacture fairly falling within the scope of the appended claims, either literally or under the doctrine of equivalents.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

The invention claimed is:

1. A manifold assembly configured for integration with a joint cover apparatus in a ducting system to detect leaking gas, the manifold assembly comprising:
    an elastomeric manifold block having a substantially circular inlet aperture and one or more gas passages having upper ends and fluidly coupled to the inlet aperture, wherein the upper ends of said one or more gas passages are configured to direct leaking gas toward one or more respective gas detectors;
    a flow control valve disposed within the manifold block between the inlet aperture and the one or more gas passages, said flow control valve configured to maintain a closed state in which a component of the flow control valve sealingly engages with the inlet aperture to preclude gas at the inlet aperture from flowing into the one or more gas passages until said gas reaches a pressure corresponding to a pressure threshold; and
    at least one aperture control plate having a substantially circular opening, said at least one aperture control plate being disposed immediately adjacent to and extending substantially along a lower end of the manifold block, said circular opening of the at least one aperture control plate being in substantial alignment with the inlet aperture of the manifold block,
    said aperture control plate adapted to maintain the substantial circularity of the inlet aperture, to in turn ensure a substantially fluid-tight seal between the inlet aperture and the one or more gas passages until said gas reaches said pressure threshold.

2. The manifold assembly according to claim 1, in which the flow control valve comprises a one-way check valve.

3. The manifold assembly according to claim 2, in which the one-way check valve further comprises a spring-biased ball valve.

4. The manifold assembly according to claim 1, in which the manifold block further comprises a spring pocket adapted to maintain a spring, wherein the flow control valve further comprises:
    a coil spring disposed in the spring pocket; and
    a ball movably disposed between the coil spring and the inlet aperture, said ball having a maximum diameter that is greater than a diameter of the inlet aperture,
    said coil spring being configured to press the ball against the inlet aperture by a predetermined amount of force so as to maintain a substantially fluid-tight seal between the inlet aperture and the one or more gas passages, wherein leaked gas pressure that exceeds the threshold pressure at the inlet aperture exerting a force against the ball causes the ball to move toward the coil spring to compress said coil spring, to in turn direct gas into the one or more gas passages.

5. The manifold assembly according to claim 1, in which the inlet aperture has a first diameter, in which the substantially circular opening in the aperture control plate has a second diameter, wherein the first diameter is substantially the same as the second diameter, said first diameter and said second diameter being operably aligned with each other.

6. The manifold assembly according to claim 1, in which the inlet aperture has a first diameter, in which the substantially circular opening in the aperture control plate has a second diameter, and wherein the first diameter is smaller than the second diameter so that an annular portion of the inlet aperture extends radially inward of said second diameter, in which the component of the fluid control valve is configured to press at least some of the annular portion into the substantially circular opening in the aperture control plate to ensure said substantially fluid-tight seal between the inlet aperture and the one or more gas passages until said gas reaches said pressure threshold.

7. The manifold assembly according to claim 1, in which the at least one rigid aperture control plate is a bottom aperture control plate, wherein the manifold assembly further comprises:
    a top aperture control plate having an elongated cutout, said top aperture control plate being disposed substantially proximate to a top end of the manifold block so as to substantially align the elongated cutout with the one or more gas passages,
    said top aperture control plate adapted to further maintain the substantial circularity of the inlet aperture to further ensure the substantially fluid-tight seal between the inlet aperture and the one or more gas passages until said gas reaches said pressure threshold.

8. The manifold assembly according to claim 1, in which said manifold assembly further comprises:
    a set screw disposed within the manifold block adjacent to the flow control valve, said set screw being operably adjustable to extend and retract toward and from a spring element of the flow control valve, thereby increasing and decreasing respectively an amount of force applied by the flow control valve against the inlet aperture.

9. The manifold assembly according to claim 1, in which the manifold block is formed from a silicone material.

10. The manifold assembly according to claim 1, in which the at least one aperture control plate is formed from a metallic material.

11. The manifold assembly according to claim 1, in which the at least one aperture control plate is integrally formed with the lower end of the manifold block.

12. The manifold assembly according to claim 1, in which the aperture control plate is disposed within the lower end of the manifold block such that a layer of elastomeric material at least partially covers a bottom surface of the aperture control plate.

13. The manifold assembly according to claim 1, in which the flow control valve includes a spring element that causes the component of the flow control valve to exert a first amount of force against the inlet aperture, and wherein the pressure threshold is proportionate to the first amount of force.

14. A joint cover apparatus, for a ducting system for transporting high temperature pressurized gases, for covering a joint between abutting duct sections, wherein the ducting system is provided with a leak detection system using one or more temperature-responsive sensor wires, the joint cover apparatus comprising:
- a split joint cover body, operably configured to be expanded;
- said split joint cover body being positionable circumferentially around a joint between abutting duct sections, the split joint cover body having an aperture therethrough, to permit the passage of gases emanating from the joint to a location external to the split joint cover body;
- at least one clamping mechanism, operably configured to releasably engage the split joint cover body, to cause the split joint cover body to be contracted around the joint;
- an elastomeric manifold block having a substantially circular inlet aperture and one or more gas passages having upper ends and fluidly coupled to the inlet aperture, wherein the upper ends of said one or more gas passages are configured to direct leaking gas toward one or more respective gas detectors;
- a flow control valve disposed within the manifold block between the inlet aperture and the one or more gas passages, said flow control valve configured to maintain a closed state in which a component of the flow control valve engages in a sealing manner with the inlet aperture to preclude gas at the inlet aperture from flowing into the one or more gas passages until said gas reaches a pressure corresponding to a pressure threshold; and
- at least one aperture control plate having a substantially circular opening, said at least one aperture control plate being disposed immediately adjacent to and extending substantially along a lower end of the manifold block, said circular opening of the at least one aperture control plate being in substantial alignment with the inlet aperture of the manifold block,
- said aperture control plate adapted to maintain the substantial circularity of the inlet aperture, to in turn ensure a substantially fluid-tight seal between the inlet aperture and the one or more gas passages until said gas reaches said pressure threshold.

15. A manifold assembly configured for integration with a joint cover apparatus in a ducting system to detect leaking gas, the manifold assembly comprising:
- an elastomeric manifold block having a substantially circular inlet aperture and one or more gas passages having upper ends and fluidly coupled to the inlet aperture, said inlet aperture having a first diameter, wherein the upper ends of said one or more gas passages are configured to direct leaking gas toward one or more respective gas detectors;
- a flow control valve disposed within the manifold block between the inlet aperture and the one or more gas passages, said flow control valve configured to maintain a closed state in which a component of the flow control valve sealingly engages with the inlet aperture to preclude gas at the inlet aperture from flowing into the one or more gas passages until said gas reaches a pressure corresponding to a pressure threshold; and
- at least one aperture control plate having a substantially circular opening, said substantially circular opening having a second diameter, wherein the first diameter is smaller than the second diameter such that an annular portion of the inlet aperture extends radially inward of said second diameter, said at least one aperture control plate being disposed substantially proximate to a lower end of the manifold block in substantial alignment with the inlet aperture of the manifold block,
- said aperture control plate adapted to maintain the substantial circularity of the inlet aperture, to in turn ensure a substantially fluid-tight seal between the inlet aperture and the one or more gas passages until said gas reaches said pressure threshold, and
- said fluid control valve being configured to press at least some of the annular portion of the inlet aperture into the substantially circular opening in the aperture control plate to ensure said substantially fluid-tight seal between the inlet aperture and the one or more gas passages until said gas reaches said pressure threshold.

16. The manifold assembly according to claim 15, in which the manifold block further comprises a spring pocket adapted to maintain a spring, wherein the flow control valve further comprises:
- a coil spring disposed in the spring pocket; and
- a ball movably disposed between the coil spring and the inlet aperture, said ball having a maximum diameter that is greater than a diameter of the inlet aperture,
- said coil spring being configured to press the ball against the inlet aperture by a predetermined amount of force so as to maintain a substantially fluid-tight seal between the inlet aperture and the one or more gas passages,
- wherein leaked gas pressure that exceeds the threshold pressure at the inlet aperture exerting a force against the ball causes the ball to move toward the coil spring to compress said coil spring, to in turn direct gas into the one or more gas passages.

17. The manifold assembly according to claim 15, in which said manifold assembly further comprises:
- a set screw disposed within the manifold block adjacent to the flow control valve, said set screw being operably adjustable to extend and retract toward and from a spring element of the flow control valve, thereby increasing and decreasing respectively an amount of force applied by the flow control valve against the inlet aperture.

18. The manifold assembly according to claim 15, in which the at least one aperture control plate is integrally formed with the lower end of the manifold block.

19. The manifold assembly according to claim 15, in which the aperture control plate is disposed within the lower end of the manifold block such that a layer of elastomeric material at least partially covers a bottom surface of the aperture control plate.

20. A manifold assembly configured for integration with a joint cover apparatus in a ducting system to detect leaking gas, the manifold assembly comprising:
- an elastomeric manifold block having a substantially circular inlet aperture and one or more gas passages having upper ends and fluidly coupled to the inlet aperture, wherein the upper ends of said one or more gas passages are configured to direct leaking gas toward one or more respective gas detectors;
- a flow control valve disposed within the manifold block between the inlet aperture and the one or more gas passages, said flow control valve configured to maintain a closed state in which a component of the flow control valve sealingly engages with the inlet aperture to preclude gas at the inlet aperture from flowing into the one or more gas passages until said gas reaches a pressure corresponding to a pressure threshold; and
- a bottom aperture control plate having a substantially circular opening, said bottom aperture control plate being disposed substantially proximate to a lower end of the manifold block in substantial alignment with the inlet aperture of the manifold block, a top aperture control plate having a substantially circular opening, said bottom aperture control plate being disposed substantially proximate to a lower end of the manifold block in substantial alignment with the inlet aperture of the manifold block, said bottom and top aperture control plates being collectively adapted to maintain the substantial circularity of the inlet aperture, to in turn ensure a substantially fluid-tight seal between the inlet aperture and the one or more gas passages until said gas reaches said pressure threshold.

\* \* \* \* \*